(12) United States Patent
Lazzara

(10) Patent No.: US 10,046,686 B1
(45) Date of Patent: Aug. 14, 2018

(54) AUTOMOBILE FLOOR MAT

(71) Applicant: Joseph Lazzara, Brossard (CA)

(72) Inventor: Joseph Lazzara, Brossard (CA)

( * ) Notice: Subject to any disclaimer, the term of this patent is extended or adjusted under 35 U.S.C. 154(b) by 0 days.

(21) Appl. No.: 15/589,523

(22) Filed: May 8, 2017

Related U.S. Application Data

(60) Provisional application No. 62/332,775, filed on May 6, 2016.

(51) Int. Cl.
*B32B 3/06* (2006.01)
*B60N 3/04* (2006.01)

(52) U.S. Cl.
CPC ............. *B60N 3/046* (2013.01); *B60N 3/044* (2013.01)

(58) Field of Classification Search
CPC ................... Y10T 428/24008; B60N 3/046; B60N 3/048; B60N 3/04; G05G 1/4834
See application file for complete search history.

(56) References Cited

U.S. PATENT DOCUMENTS

| | | | |
|---|---|---|---|
| 1,896,975 A | 2/1933 | Humphrey et al. | |
| 2,680,385 A * | 6/1954 | Estin | B60N 3/044 180/90.6 |
| 4,721,641 A | 1/1988 | Bailey | |
| 4,748,063 A | 5/1988 | Reuben | |
| 4,810,024 A | 3/1989 | Heller | |
| 6,027,782 A | 2/2000 | Sherman | |
| 7,727,612 B2 | 6/2010 | Haraguchi et al. | |
| 2008/0233337 A1 | 9/2008 | Wilson et al. | |
| 2011/0009994 A1 | 1/2011 | MacNeil et al. | |

* cited by examiner

*Primary Examiner* — Alexander S Thomas
(74) *Attorney, Agent, or Firm* — Cramer Patent & Design, PLLC; Aaron R. Crammer

(57) ABSTRACT

An automobile floor mat is fashioned as a flexible mat having an upright portion and a base portion. A pair of straps are secured to the back side of the upright portion and capable of removable attachment to a foot pedal of the automobile. The surface of the base portion has a depressed region forming a small basin designed to capture water and soil from the automobile operator's shoes.

20 Claims, 3 Drawing Sheets ated at during automobile operation. The present invention fulfills this need.

AUTOMOBILE FLOOR MAT

RELATED APPLICATIONS

The present invention was first described in and claims the benefit of U.S. Provisional Application No. 62/332,775 filed May 6, 2016, the entire disclosures of which are incorporated herein by reference.

FIELD OF THE INVENTION

The present invention relates generally to the field of floor mats to be used in automobiles.

BACKGROUND OF THE INVENTION

Often, when a motorist is operating an automobile for an extended amount of time, the pressure on the bottom of the foot or feet can be painful. Common remedies are floor mats that have cushioning in them to lessen the force one puts on the floor of the automobile. These types of floor mats are bulky and can get in the way of the accelerator and/or brake pedals. Therefore, there is a need for a cushioning floor mat that can interact with the accelerator and/or brake pedal and not hinder their function, yet still provide comfort to the foot or feet of the motorist.

There has also seen a need for such a floor mat that is capable of collecting water, mud, and other debris falling from an operator's shoe, and subsequently directing the collected water, mud, and debris onto an existing weather mat subjacent the present invention. The present invention is intended to provide protection for an automobile's carpet all year round from stain or crushed or pressed carpet commonly occurring at during automobile operation. The present invention fulfills this need.

SUMMARY OF THE INVENTION

The inventor has recognized the aforementioned issues and inherent problems and observed that there is a lack in the prior art for an automobile floor mat.

It is therefore an object of the invention to provide a floor mat comprising a base, an upright portion and a fastening means. The base comprises a base top side, a base bottom side, a front ridge, a rear ridge having a rear ridge top side, a perimeter rim about the base top side, a center ridge which is connected to and contiguous with the perimeter rim at each center ridge end along a longitudinal line of the base, a first basin which is disposed on a first side of the center ridge and a second basin which is disposed on a second side of the center ridge. The upright portion comprises an upright portion front face, an upright portion rear face, an upright portion first side, an upright portion second side, an upright portion third side and an upright portion fourth side. The fastening means is disposed upon the upright portion rear face and is capable of removably fastening the upright portion to an operating pedal of an automobile. The upright portion first side is flexibly secured to the rear ridge top side. In a separate embodiment, the upright portion may be integrally molded to the base at the upright portion first side and the rear ridge top side.

The fastening means may comprise of a first strap anchor which is disposed upon the upright portion rear face adjacent the upright portion second side and the upright portion third side, a second strap anchor which is disposed upon the upright portion rear face adjacent the upright portion first side and the upright portion second side, a first strap receiver which is disposed upon the upright portion rear face adjacent the upright portion third side and the upright portion fourth side opposite the first strap anchor, a second strap receiver which is disposed upon the upright portion rear face adjacent the upright portion first side and the upright portion fourth side opposite the second strap anchor, a first strap which is secured at a first strap first end to the first strap anchor and a first strap fastener secured at a first strap second end and a second strap which is secured at a second strap first end to the second strap anchor and a second strap fastener secured at a second strap second end. The first strap is capable of being secured about a first portion of the operating pedal and the second strap is capable of being secured about a second portion of the operating pedal.

The first strap fastener and the second strap faster may comprise complementary portions of a hook and loop material. The upright portion front face may comprise an integrally-molded high-friction non-skid surface. The base bottom side may comprise an integrally-molded high-friction non-skid surface. A height of the perimeter rim may be higher at the rear ridge than at the front ridge while a height of the center ridge may be higher at the rear ridge than at the front ridge. The base may comprise a greater thickness than the upright portion and may also have a curved shape. The base and the upright portion may comprise a durable and flexible material.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | automobile floor mat |
| 20 | upright portion |
| 22 | upper platform |
| 24 | non-skid surface |
| 25a | first strap anchor |
| 25b | second strap anchor |
| 26a | first strap receiver |
| 26b | second strap receiver |
| 28a | first strap |
| 28b | second strap |
| 32 | fastener |
| 50 | base portion |
| 51 | rear ridge |
| 52a | first basin portion |
| 52b | second basin portion |
| 53 | center ridge |
| 54 | rim |
| 55 | base portion underside |
| 56 | base portion gripping features |

-continued

| 57 | front ridge |
| 100 | automobile pedal |
| 110 | floor surface |

DETAILED DESCRIPTION OF THE FIRST EMBODIMENT

Figure 1:
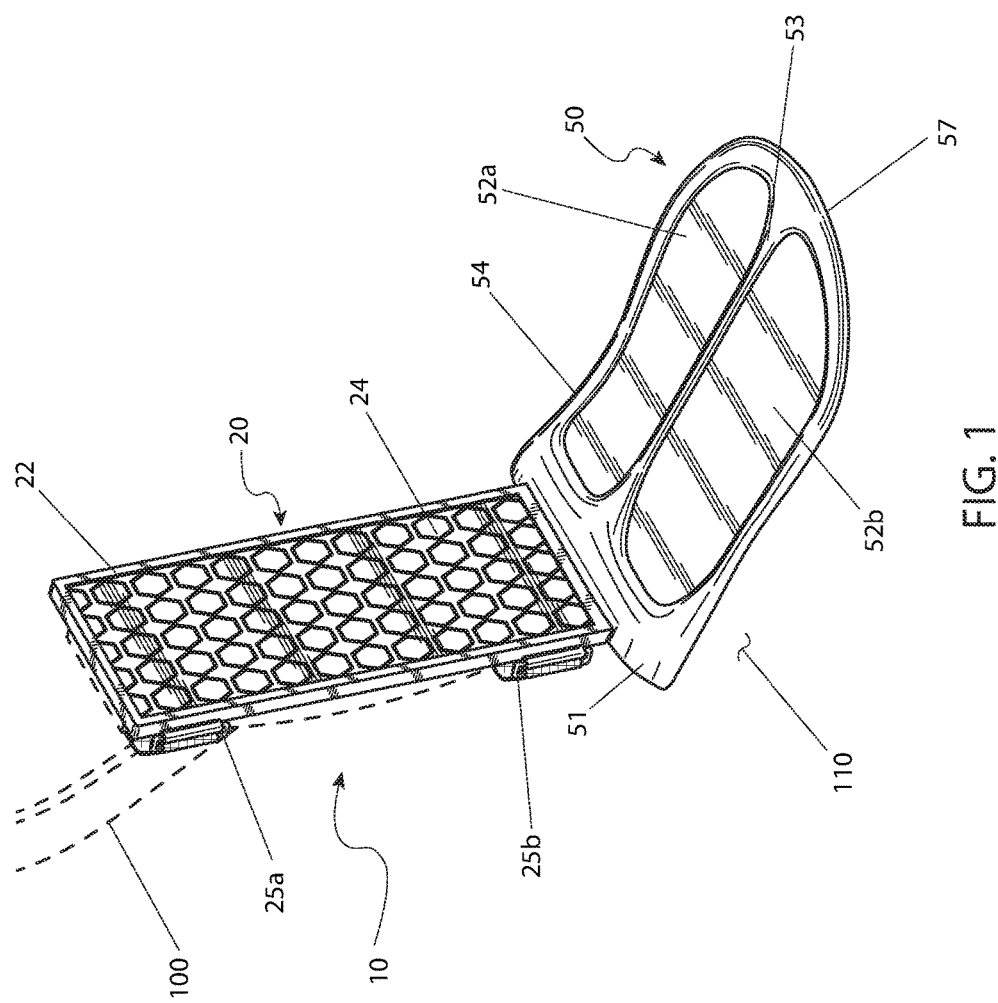
FIG. 1 is a front perspective view of an automobile floor mat 10, according to a first embodiment of the present invention.
Figure 2:
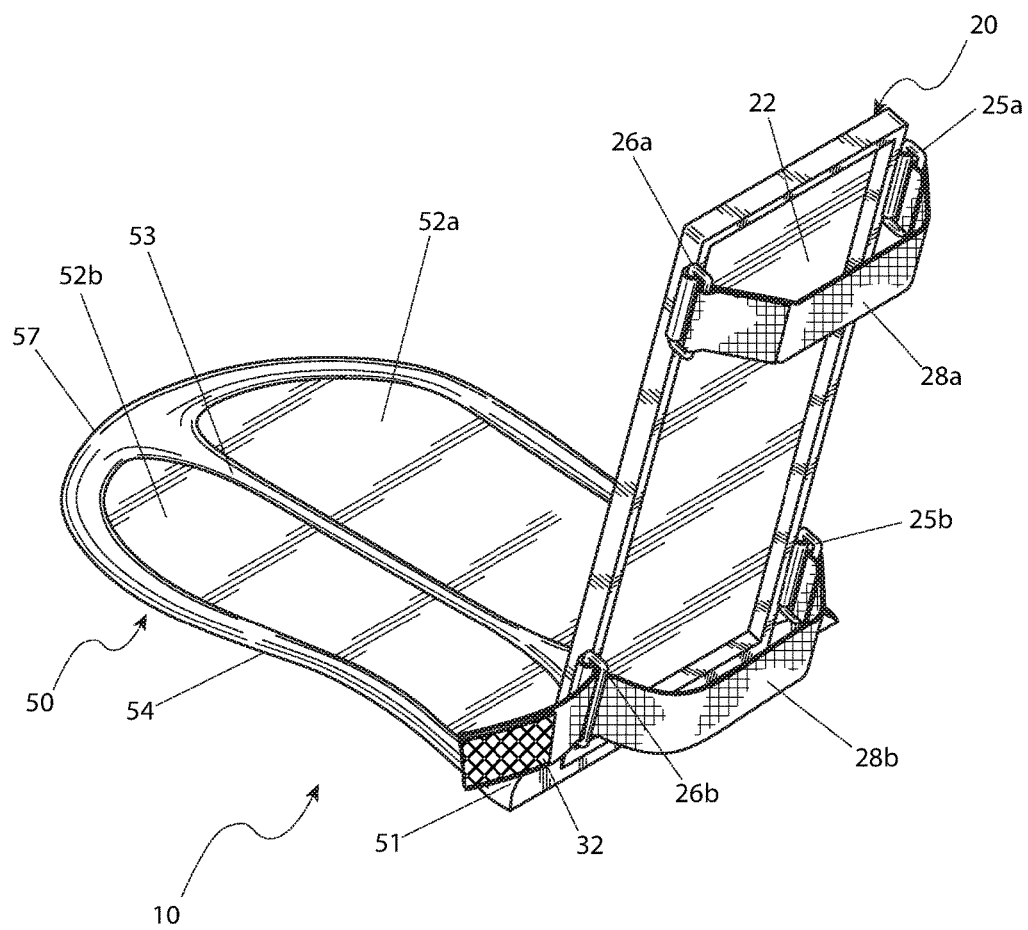
FIG. 2 is a rear perspective view of the automobile floor mat 10, according to a first embodiment of the present invention; and, FIG. 3 is a bottom side view the base portion 50 of the automobile floor mat 10, according to a second embodiment of the present invention.
Figure 3:
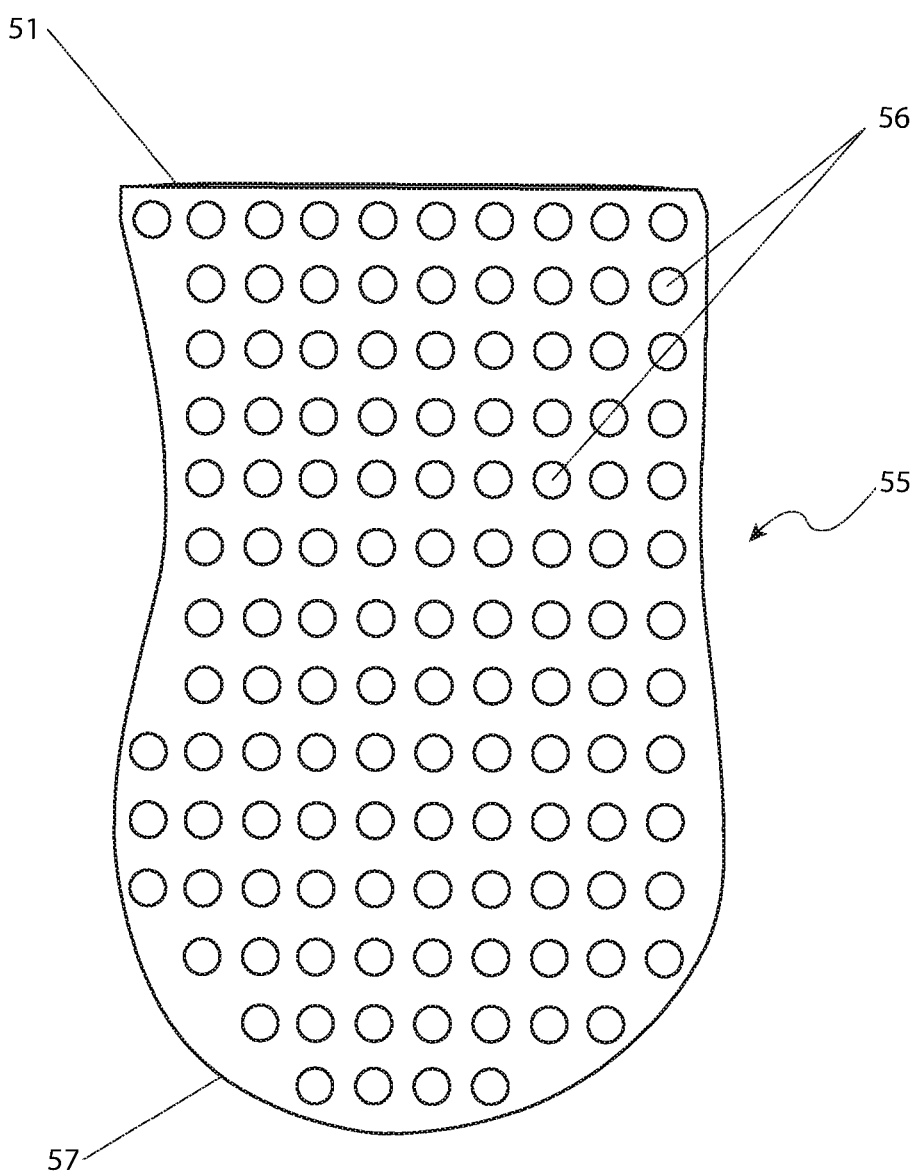

The best mode for carrying out the invention is presented in terms of its first embodiment, herein depicted within FIGS. 1-3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes an automobile floor mat (herein described as the "device") 10, which provides a means to prevent migration of water and soil present upon an automobile operator's shoes onto a subjacent floor surface 110 of the automobile. The device 10 is to be held securely in position via attachment to a pedal portion 100 of the automobile via a pair of straps 28a, 28b.

Referring now to FIG. 1, a front perspective view of the device 10, according to the first embodiment of the present invention, is disclosed. The device 10 includes an upright portion 20 and a base portion 50. The upright 20 and base 50 portions are envisioned to be manufactured as a single injection-molded structure preferably made using semi-rigid rubber, plastic materials or silicone for endurance and flexibility. The bottom edge of the upright portion 20 is joined to the base portion 50 at an integrally-molded rear ridge portion 51, which forms the rear upper edge thereof. In use, the base portion 50 remains stationary upon the floor 110 of the automobile while supporting the operator's shoe. The upright portion 20 in turn is capable of pivoting about the rear ridge portion 51 as the upright portion 20, and affixed automobile pedal 100, are pressed during operation of the automobile by the operator.

The upright portion 20 includes a generally rectangular and planar upper platform 22 with a perimeter lip located on the rear, having a front surface portion being covered all over by an integrally-molded high-friction pattern to provide a non-skid surface 24. The upright portion 20 also provides a pair of straps 28a, 28b, each having a first end affixed to a pair of strap anchors 25a, 25b, each adjacent an upper and lower position on the rear lip on one (1) side, and each having a second end having a fastener 32. A pair of strap receivers 26a, 26b are affixed to vertically aligned positions on the rear perimeter lip on the opposite side from the strap anchors 25a, 25b, of the straps 28a, 28b.

The base portion 50 acts to support the operator's shoe during normal driving of the automobile as well as receiving and containing water and soil which may originate from the operator's shoe. The base portion 50 is generally of a greater thickness than the upright portion 20 in order to cushion the force of an operator's shoe, particularly the heel portion, during automobile operation. The base portion 50, first basin portion 52a and second basin portion 52b are each envisioned to have an oval, elliptical shape or curved shape contoured to accommodate the shape and/or form of a given sole of a user's right or left shoe, in turn including an upwardly protruding perimeter rim portion 54 from distal ends of the rear ridge portion 51. The rim 54 decreases in height as it approaches the front 57 of the base portion 50 from a first distal end of the rear ridge 51 and then again increases in height as it approaches a second distal end of the rear ridge 51. A center ridge portion 53 bisects the basin into two (2) halves 52a, 52b, thereby forming a shallow flat-bottom basin 52 capable of containing a quantity of water and soil. The center ridge portion 53, similar to the perimeter rim 54, decreases in height as it approaches the front 57 of the base portion 50. The basin halves 52a, 52b will provide a means to pool the water and soil dripping from the operator's shoes. Also, this pooled water and debris are directed to a subjacent weather mat already installed in the automobile due to the thinness of the perimeter rim 54 and center ridge 53 portions.

Referring now to FIG. 2, a rear perspective view of the device 10, according to the first embodiment of the present invention, is disclosed. The device 10 provides an attachment means to an existing accelerator pedal portion 100 of an automobile via a first strap 28 and a second strap 28b each having a first end affixed to a pair of strap anchors 25a, 25b. An embodiment of the device 10 is shown here having pairs of opposing strap receivers 26a, 26b being positioned at top and at bottom locations so as to provide routing of, and attachment of respective first and second straps 28a, 28b. The straps 28a, 28b act to secure the device 10 to the existing automobile pedal 100, being arranged in a parallel manner, each being routed through respective pairs of strap receivers 26a, 26b, and subsequently secured by attaching the fastener 32 at the second end of each strap 28a, 28b onto a desired location on the strap 28a, 28b itself. The adjustable nature of the fasteners 32 enables installation of the device 10 onto various sized and shaped automobile pedals 100 found in different automobiles.

Referring now to FIG. 3, a bottom side view the base portion 50 of the automobile floor mat 10, according to a second embodiment of the present invention. The second embodiment provides for gripping features 56 on an underside 55 of the base portion 50 to provide enhanced traction and non-slip use of the device 10 when on an automobile's carpet or an already existing weather mat.

The first strap 28a is shown here being fastened to itself. The second strap 28b is in a detached state for illustration sake of the fastener 32.

In a first embodiment, each pedal strap 28a, 28b is made of a flat textile strapping material similar to that being one-half (½) of a hook-and-loop-type fastener, while the fastener 32 is the other half, which correspondingly mate together, similar to that of VELCRO®. Each strap 28a, 28b is installed upon the upright portion 20 by inserting the strap 28a, 28b through a respective pair of strap receivers 26a, 26b. The opposite end of the strap 28a, 28b is wrapped around the automobile pedal 100, and then doubled back upon itself, thereby positioning the fastener 32 to mate with the strap 28a, 28b in a parallel manner for easy adjustment and fastening (also see FIG. 1). The straps 28a, 28b could also include elastic properties to enable more customized fitting around an automobile pedal 100. The straps are preferably one inch (1 in.) in width to ensure that they provide suitable resiliency for keeping the device 10 on the automobile pedal 100.

It is envisioned that other styles and configurations of the present invention can be easily incorporated into the teachings of the present invention, and only one particular configuration shall be shown and described for purposes of clarity and disclosure and not by way of limitation of scope.

The first embodiment of the present invention can be utilized by the common user in a simple and effortless manner with little or no training. After initial purchase or acquisition of the device 10, it would be installed as indicated in FIGS. 1 and 2.

The method of utilizing the device 10 may be achieved by performing the following steps: procuring the device 10; positioning the base portion 50 of the device 10 upon the floor surface 110 of the automobile adjacent to an existing automobile pedal portion 100; attaching the device 10 to the automobile pedal 100 by inserting the second distal end of the first strap 28a through the first strap receiver 26a, wrapping the first strap 28a securely around the automobile pedal 100, and fastening the fastener 32 to the desired location on the first strap 28a; installing the second strap 28b in like manner; and, benefiting from protection of an automobile's floor surface 110 from water and soil present upon an automobile operator's shoes, afforded a user of the present invention 10.

It is understood that multiple units of the device 10 may be procured and used upon more than one (1) pedal 100 within the automobile if desired, and as such should not be interpreted as a limiting factor of the device 10.

The exact specifications, materials used, and method of use of the spinner 10 may vary upon manufacturing. The foregoing descriptions of specific embodiments of the present invention have been presented for purposes of illustration and description. They are not intended to be exhaustive or to limit the invention to the precise forms disclosed, and obviously, many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A floor mat;
    a base, comprising:
        a base top side;
        a base bottom side;
        a front ridge;
        a rear ridge having a rear ridge top side;
        a perimeter rim about said base top side;
        a center ridge connected to and contiguous with said perimeter rim at each center ridge end along a longitudinal line of said base;
        a first basin disposed on a first side of said center ridge; and,
        a second basin disposed on a second side of said center ridge; and,
    an upright portion comprising:
        an upright portion front face;
        an upright portion rear face;
        an upright portion first side;
        an upright portion second side;
        an upright portion third side; and,
        an upright portion fourth side; and,
    a fastening means disposed upon said upright portion rear face capable of removably fastening said upright portion to an operating pedal of an automobile;
    wherein said upright portion first side is flexibly secured to said rear ridge top side.

2. The mat of claim 1, wherein said fastening means comprises:
    a first strap anchor disposed upon said upright portion rear face adjacent said upright portion second side and said upright portion third side;
    a second strap anchor disposed upon said upright portion rear face adjacent said upright portion first side and said upright portion second side;
    a first strap receiver disposed upon said upright portion rear face adjacent said upright portion third side and said upright portion fourth side opposite said first strap anchor;
    a second strap receiver disposed upon said upright portion rear face adjacent said upright portion first side and said upright portion fourth side opposite said second strap anchor;
    a first strap secured at a first strap first end to said first strap anchor and a first strap fastener secured at a first strap second end; and,
    a second strap secured at a second strap first end to said second strap anchor and a second strap fastener secured at a second strap second end;
    wherein said first strap is capable of being secured about a first portion of said operating pedal; and,
    wherein said second strap is capable of being secured about a second portion of said operating pedal.

3. The mat of claim 2, wherein said first strap fastener and said second strap faster comprises complementary portions of a hook and loop material.

4. The mat of claim 1, wherein said base and said upright portion are integrally-molded.

5. The mat of claim 4, wherein said base comprises a greater thickness than said upright portion.

6. The mat of claim 5, wherein said base comprises a curved shape.

7. The mat of claim 1, wherein said upright portion front face comprises an integrally-molded high-friction non-skid surface.

8. The mat of claim 1, wherein said base bottom side comprises an integrally-molded high-friction non-skid surface.

9. The mat of claim 1, wherein a height of said perimeter rim is higher at said rear ridge than at said front ridge.

10. The mat of claim 1, wherein a height of said center ridge is higher at said rear ridge than at said front ridge.

11. A floor mat;
    a base, comprising:
        a base top side;
        a base bottom side;
        a front ridge;
        a rear ridge having a rear ridge top side;
        a perimeter rim about said base top side;
        a center ridge connected to and contiguous with said perimeter rim at each center ridge end along a longitudinal line of said base;
        a first basin disposed on a first side of said center ridge; and,
        a second basin disposed on a second side of said center ridge; and,
    an upright portion comprising:
        an upright portion front face;
        an upright portion rear face;
        an upright portion first side;
        an upright portion second side;
        an upright portion third side; and,
        an upright portion fourth side; and, a fastening means disposed upon said upright portion rear face capable of removably fastening said upright portion to an operating pedal of an automobile;

wherein said upright portion is integrally molded to said base at said upright portion first side and said rear ridge top side.

12. The mat of claim 11, wherein said fastening means comprises:

a first strap anchor disposed upon said upright portion rear face adjacent said upright portion second side and said upright portion third side;

a second strap anchor disposed upon said upright portion rear face adjacent said upright portion first side and said upright portion second side;

a first strap receiver disposed upon said upright portion rear face adjacent said upright portion third side and said upright portion fourth side opposite said first strap anchor;

a second strap receiver disposed upon said upright portion rear face adjacent said upright portion first side and said upright portion fourth side opposite said second strap anchor;

a first strap secured at a first strap first end to said first strap anchor and a first strap fastener secured at a first strap second end; and, a second strap secured at a second strap first end to said second strap anchor and a second strap fastener secured at a second strap second end;

wherein said first strap is capable of being secured about a first portion of said operating pedal; and, wherein said second strap is capable of being secured about a second portion of said operating pedal.

13. The mat of claim 12, wherein said first strap fastener and said second strap faster comprises complementary mating portions of a hook and loop material.

14. The mat of claim 11, wherein said base and said upright portion comprise a durable and flexible material.

15. The mat of claim 14, wherein said base comprises a greater thickness than said upright portion.

16. The mat of claim 15, wherein said base comprises a curved shape.

17. The mat of claim 11, wherein said upright portion front face comprises an integrally-molded high-friction non-skid surface.

18. The mat of claim 11, wherein said base bottom side comprises an integrally-molded high-friction non-skid surface.

19. The mat of claim 11, wherein a height of said perimeter rim is higher at said rear ridge than at said front ridge.

20. The mat of claim 11, wherein a height of said center ridge is higher at said rear ridge than at said front ridge.

* * * * *